Dec. 3, 1929.                    W. G. STEVENS, JR                    1,738,462
                              GEAR SHIFTER MECHANISM
                          Filed Nov. 14, 1927        3 Sheets-Sheet 3
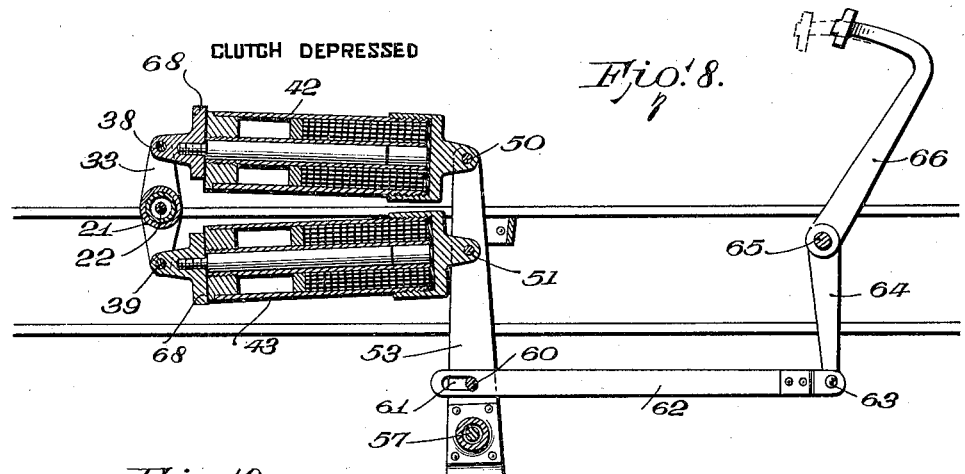
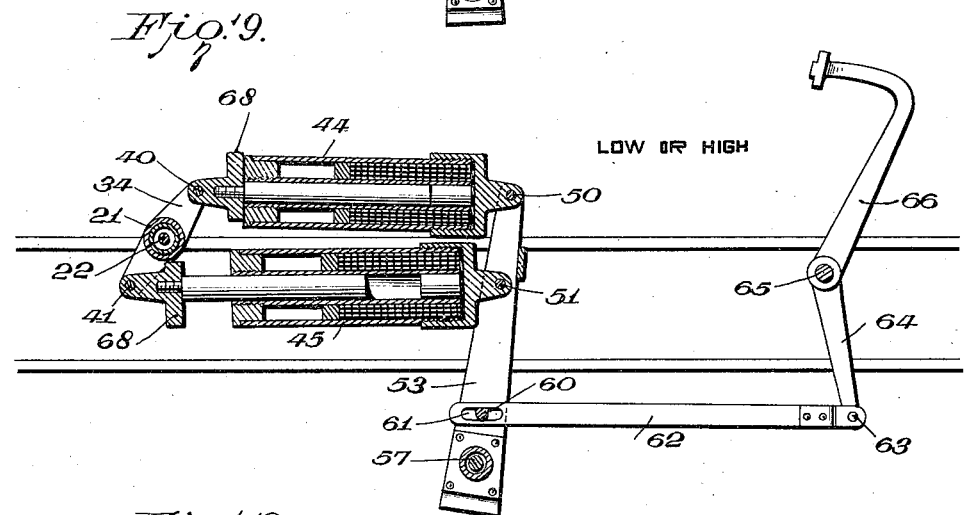
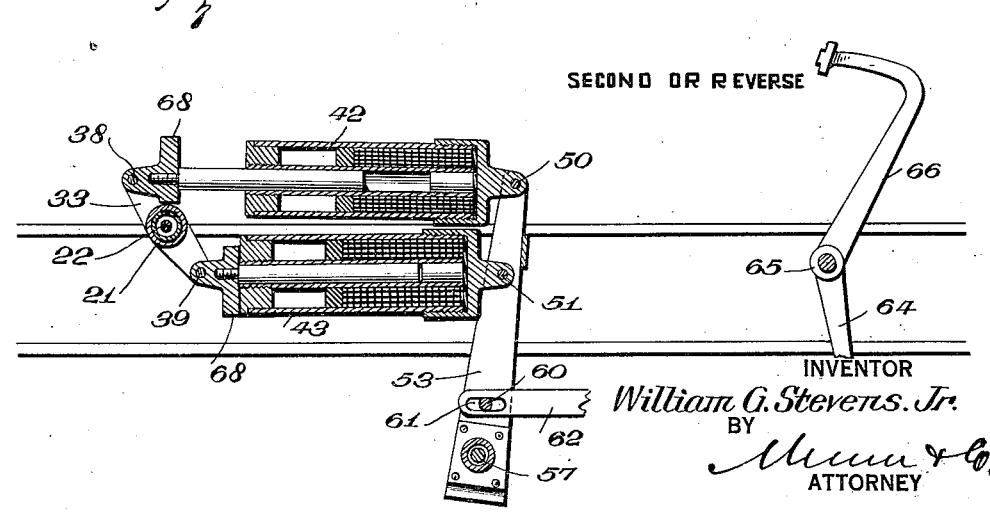
INVENTOR
William G. Stevens. Jr.
BY
*Munn & Co.*
ATTORNEY Patented Dec. 3, 1929

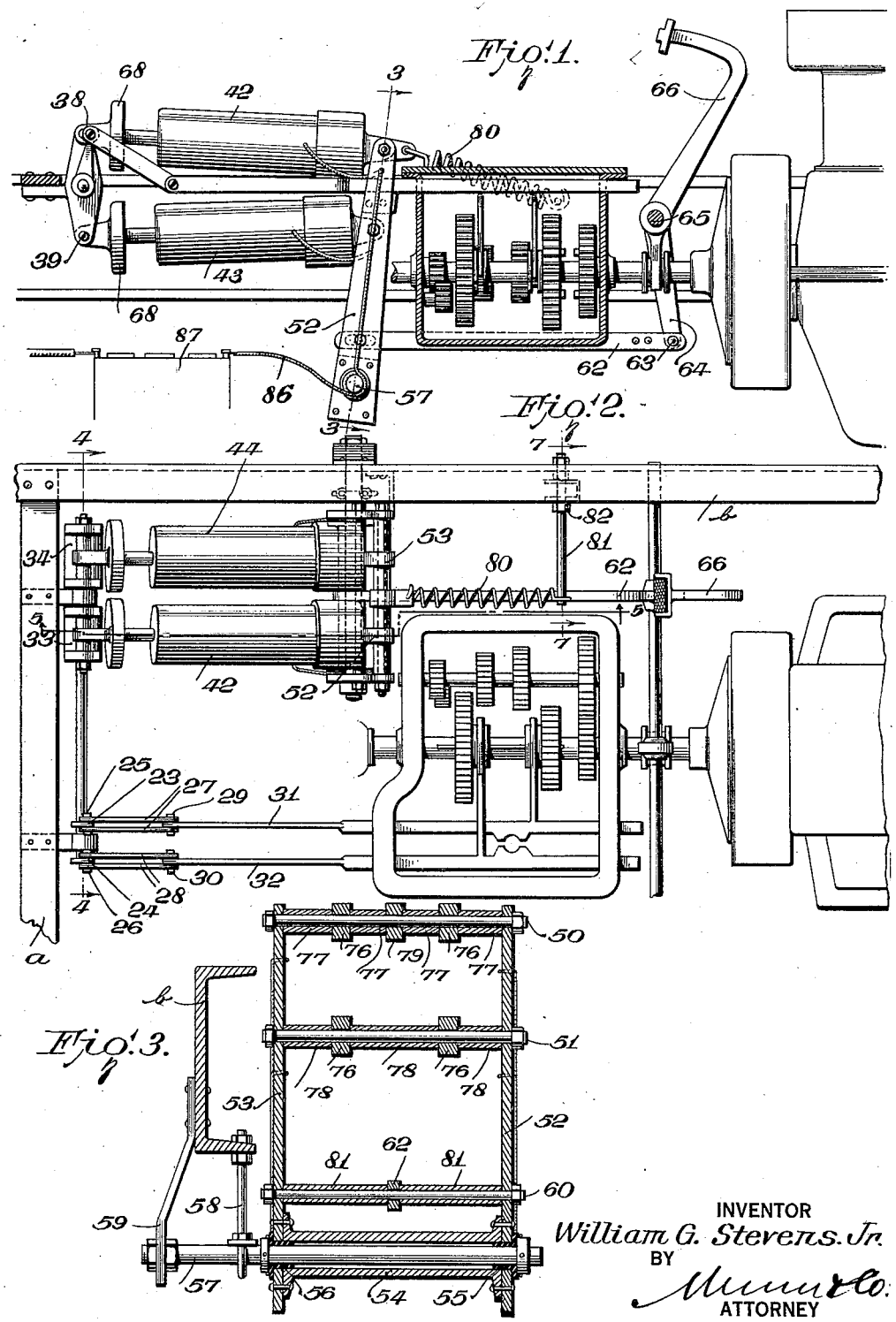

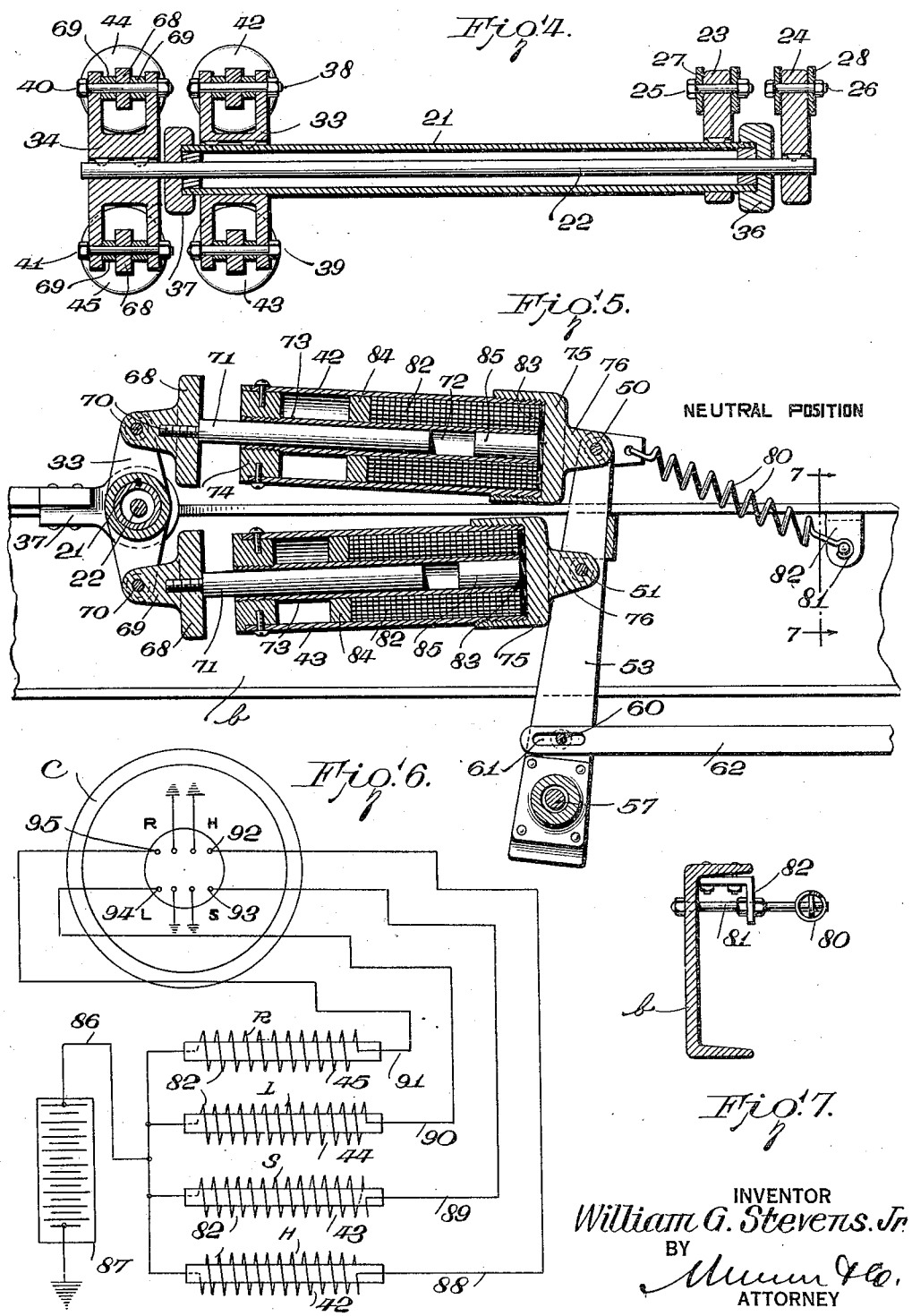

1,738,462

UNITED STATES PATENT OFFICE

WILLIAM G. STEVENS, JR., OF NEW YORK, N. Y.

GEAR-SHIFTER MECHANISM

Application filed November 14, 1927. Serial No. 233,224.

This invention relates to improvements in gear shifter mechanisms generally, and more particularly to a type thereof for controlling the starting, speed and reversed directional movements of motor vehicles and the like.

The principal object of the invention is to provide for an electrically operated gear shifter mechanism of the class set forth, and one of a refined construction and arrangement of parts and circuits readily adapting the same for application to and use with any form of sliding gear transmissions, and particularly to and with standard three speeds and reverse types of such transmissions as are commonly employed on motor vehicles of all classes and descriptions.

Another object of the invention is to provide for a gear shifter mechanism as hereinbefore characterized, and one embodying selective electric controlling means for effecting the operation of a transmission correspondingly for the low, intermediate or second, high and reversed speed and directional movements of a motor vehicle, and which utilizes the holding power of electro-magnets for the accomplishment of such operation.

A further object of the invention is to provide for mechanism of the character described, and one wherein a mechanical connection is established between movable parts of the mechanism and the transmission during the energization of associated electromagnets and magnetically held plungers.

A still further object of the invention is to provide for mechanism of the character mentioned, and one embodying instrumentalities for automatically neutralizing the transmission gearing whenever the clutch operating pedal is fully depressed.

Another object of the invention is to provide for an extremely simplified mechanism of the type set forth, and one which is adapted to be readily installed in a desired position of operation on motor vehicles or the like, attached or connected directly to the actuating rods of a transmission, and which is not likely to get out of order easily.

With the foregoing and other equally important objects in view, the invention resides in the certain new and useful combination, construction and arrangement of parts and circuits as will be hereinafter more fully described, set forth in the appended claims, and illustrated in the accompanying drawings in which:

Figure 1 is a fragmentary side elevation of a motor vehicle chassis and the power plant thereon, showing a practical application of the invention and as it appears when operatively associated with the power transmission mechanism, the latter being partly in section, Figure 2 is a fragmentary top plan view thereof, Figure 3 is a vertical transverse section taken on the line 3—3 of Figure 1, Figure 4 is an enlarged sectional detail taken on the line 4—4 of Figure 2, Figure 5 is an enlarged vertical longitudinal section taken on the line 5—5 of Figure 2, Figure 6 is a diagrammatical plan view of the circuit connections between the electromagnets of the shifter mechanism, the source of current supply, and the control devices or switches, the latter being associated with the steering wheel of an automobile, Figure 7 is an enlarged vertical transverse section taken on the line 7—7 of Figure 5, Figure 8 is a vertical longitudinal section through certain of the electro-magnets, with the associated parts of the mechanism in side elevation, and showing the position of the magnets and said parts when the clutch pedal is fully depressed, Figure 9 is a view similar to that of Figure 8, but showing the position of the magnets and parts when operative to shift gears to low and high speed positions of operation of the gears, and Figure 10 is another similar view showing the positions of the magnets and parts when operative to shift gears to the second and reverse speed positions of operation of the gears.

Referring to the drawings, wherein similar characters of reference designate corresponding parts throughout the several views thereof, the improved gear shifting mechanism, as illustrated. comprises essentially two dual revoluble shafts 21 and 22, the shaft 21 being preferably of hollow or tubular construction to have the shaft 22, which is preferably of solid construction, extended concentrically through the same. The opposite ends of the solid shaft 22, of the double dual-revoluble shaft assembly, as thus provided, are projected from the ends of the hollow shaft 21, and keyed on one of its projected ends is an arm 24 corresponding to a similar arm 23, keyed on the complemental end of the hollow shaft 21. These single arms 23 and 24 are respectively pivoted, as at 25 and 26, to suitable links 27 and 28, which, in turn, are pivoted, as at 29 and 30, to complemental ends of transmission rods 31 and 32, through the medium of which the sliding gears of the transmission unit or mechanism of a motor vehicle or the like, are to be shifted to either of their neutral or operative positions. Similarly keyed on the opposite ends of the shafts 21 and 22 respectively, are double arms 33 and 34. The opposite ends of both shafts 21 and 22 are journalled in suitable bearings 36 and 37' which are preferably secured in proper position on one of the cross frame members a of the vehicle chassis b, somewhat as shown in Figure 2, the opposite ends of each of the double arms 33 and 34 are bifurcated to provide notches for the pivoting within the same, on the cross pivot pins 38, 39 and 40, 41 respectively, of the complemental ends of pairs of electro-magnetic links, designated in their entireties, as at 42, 43 and 44, 45, the opposite ends of which electro-magnetic links are pivotally connected to a pair of cross shafts or rods 50 and 51, extending between a pair of rocker arms 52 and 53. The lower of these arms 52 and 53 are secured, as by being bolted or riveted as shown, to the opposite ends of a sleeve 54, which is supported at its opposite ends on bearings 55 and 56 carried on a shaft 57 projecting from a pair of brackets or hangers 58 and 59 secured in proper position on a side frame member of the chassis b of the vehicle. Extending between the rocker arms 52 and 53, just above the pivot sleeve 54 is a rod 60, which is engaged in an elongated slot 61 formed on the longitudinal center of a connecting bar 62 at one end of the same, the opposite end of which connecting bar 62 being pivoted, as at 63, to the lower end of an arm or extension 64 depending from the pivoted end 65 of the clutch operating foot pedal 66 of the automobile.

Each of the electro-magnets or solenoids 42, 43, 44 and 45 comprises an end member or cap 68, which is formed to provide an outwardly extending and centrally disposed lug having an aperture through the same to be engaged on a complemental pivot pin 38, 39, 40 or 41 carried by the bifurcated end of the double arms 33 and 34 on the shafts 21 and 22. These lugs 68 are spaced to the centers of the said pivot pins by spacing collars 69. These end members or caps 68 are carried on reduced end portions 70 of cores or plungers 71, which are disposed in sliding engagement in the bores 72, or guide sleeves 73, arranged concentrically within the cylindrical outer casings of the several electro-magnets or solenoids 42, 43, 44 and 45. The open ends of the guide sleeves 73 are arranged in screw-threaded engagement in circular end walls or blocks 74 fitted in the ends of the cylindrical casings, adjacent the members or caps 68, while the opposite ends of these guide sleeves 73 are closed by being abutted against the inner faces of end closures or caps 75, which are threaded onto opposite ends of the cylindrical casings of the electro-magnets or solenoids 42, 43, 44 and 45. These end closures or caps 75 are also provided with centrally disposed and outwardly extending lugs 76, which are apertured for engagement on the cross rods 50 and 51 of the rocker arms 52 and 53. The lugs 76 are held in properly spaced relation on the cross rods 50 and 51 by means of the spacing sleeves 77 and 78 engaged on these cross rods, respectively. Mounted on the upper of the cross rods 50 and 51 of the rocker arms 52 and 53, between the intermediate of the spacing sleeves, is a lug or arm 79, which has its free end apertured to receive one end of a coiled spring 80, the opposite end of which spring is attached to a fixed part of the chassis b. Similarly, the connecting rod 62 has its slotted end spaced to the center of the pivot rod 60 between the spacing sleeves 81. Housed within the cylindrical casings 42, 43, 44 and 45 of the electro-magnets or solenoids, and surrounding the tube or sleeve 73 are coils 82, which have their forward ends abutted against disks or washers of an insulating material, positioned against the inner faces of the end members or caps 75, while their rear ends are abutted against washers 84, preferably of iron, positioned on the tubes or sleeves 73, and these latter washers are spaced inwardly of the cylindrical casings, and of the end wall or closures 74. Secured in the forward ends of the members of the tubes or sleeves 73 are short stubs or cores 85, which are abutted against the end member caps 75, and form stops for limiting the inward movement of the movable cores or plungers 71. It will be understood that the plungers 71, the end members or caps 75, the disks or washers 84 and the stops 85 are of metal, preferably iron, while the cylindrical casings 42, 43, 44 and 45 are of steel, so that they provide substantially closed magnetic circuits for the obtaining of maximum magnetic effects from current passed through the coils 82. The tubes or sleeves 73 are preferably of brass, for obvious reasons.

Referring particularly to Figure 6, it will be seen that one terminal of each of the coils 82, of the electromagnets 42, 43, 44 and 45 are commonly connected by a conductor 86 to one terminal of the usual source of current supply or battery 87 of the motor vehicle, while the other terminal of the latter is grounded to the frame of the vehicle. The other terminals of the coils 82 of the electromagnets or solenoids are respectively connected by conductors 88, 89, 90 and 91 to one terminal of each of the switching devices 92, 93, 94 and 95 mounted on or near the usual steering wheel or hand controlled device $c$ of the motor vehicle, the other terminals of each switching device being grounded to the vehicle frame through the steering post on which the hand post or steering control $c$ is mounted. These switching devices 92, 93, 94 and 95 may be of any suitable shape, but the same are preferably in the form of push button types thereof. It is to be noted of these electro-magnets 42, 43, 44 and 45 that, when the coils 82 are energized, the magnetic pull on the cores or plungers 71 increases as the inner ends of the latter approach the stationary cores or stops 85, and that a holding effect is obtained when the opposed ends of the plunger 71 and the stationary cores or stops 85 are in abutting relation. Now, as the plungers 71 move away from the stationary cores or stops 85, the gap or space between the same causes a magnetic leakage, which leakage lessens the holding or pulling effect on the plungers. With a coil 82 energized, and a plunger 71 moved inwardly of the tube or sleeve 73 and into abutting relation to a stationary core or stop 85, maximum holding effect occurs, and the magnetic flux passes in closed circuit from a plunger 71 uniformly in all radial directions through the soft iron washers 84 to the steel cylinders or tubes to the end members or heads 75, and from thence to the stationary cores or stops 85. It is, therefore, the purpose of the invention to utilize the force of the maximum magnetic holding effects on the plungers 71, when the latter are in actual abutting or contacting relation with respect to the stationary cores or stops 85 to establish a connecting link between the rocker member 52, 53 and the shafts 21, 22, through the double arms 33 and 34, in a manner to effect a proper and desired shifting of the gears of the transmission.

In the operation of the mechanism, as thus constructed and arranged, and with the several gears of the transmission $d$ in neutral position, the several arms 23, 24, 33 and 34 on the shafts 21 and 22 are also in neutral or vertical position, substantially as indicated by the position of the double arm 33 in Figure 5. Now, if it is desired to place the transmission in low speed, the operator will actuate the switch 94 to close the circuit to the coil 82 of the electro-magnet or magnetic link 44, when the current will flow from the battery 87, by way of conductor 86 to coil 82 of the magnet or link 44, and from thence by conductor 90 to one terminal of the switch 94, and from the other terminal of the latter to ground and back to the grounded terminal of the battery 87. With the coil 82 energized, the operator will now depress the clutch pedal 66, when the motion of the pedal will be transmitted through connecting rod 62 to the rocker arms 52 and 53, and against the tension of the coil spring 80, so that the parts of the mechanism assume the position substantially as is shown in Figure 8 from their previous positions, as illustrated in Figure 5. When the clutch pedal 66 reaches its full neutral or depressed position, as shown in Figure 8, it will be seen that the plungers 71, of the magnetic links or solenoids 42 and 43 move inwardly of the tubes 73, and into abutting relation with the stationary cores or stops 85. The operator now releases foot pressure on the clutch pedal 66, so that the spring 80 is free to actuate the rocker arms 52 and 53. As the rocker arms swing under the action of the spring 80, in a clockwise direction, the "low" electro-magnet 44 forms a connecting link between the rocker and the arm 34 on the shaft 22. It is to be here noted that the electro-magnets 42, 43, 44 and 45 do not pull or otherwise contract the plungers 71 in a sense that the latter are drawn toward and against the stops 85, but the magnetic effect of the magnets is simply intended to hold the plungers, so that they remain abutted against the stops in order to form rigid connections extending between the rocker arms 52 and 53 and the arms 33 and 34, or, in other words, whenever an electromagnet is energized, and the complemental plunger is abutted against its stop, the electro-magnet in its entirety functions as a rigid link between the rocker arms 52, 53 and the arms 33, 34. Now, upon the operation of the spring 80, as above explained, the rocker arms 52 and 53 are pulled in a forward direction when the arm 34 will rotate with the shaft 22, also in a clockwise direction. With the rotation of the shaft 22, the arm 24, at the opposite end thereof, is also rotated in a clockwise direction and exerts a force on the "reverse-low" transmission rod 32 of the transmission gear set of the vehicle, which transmission rod is moved in a forward direction and brings the "low" or first speed gear of the transmission into mesh. During the transmission of this motion between the spring 80 and the transmission rod 32, the plungers 71 of the other of the electro-magnets 42, 43, and 45 are free to slide in their supporting sleeves 73. The shifts for second or "intermediate" speed, and for third or "high" speed are accomplished in the same manner as just described for the "low" speed shift, and are performed through the medium of the electro-magnets 43 and 42, respectively. However, it is to be noted that each of the four plungers 71 are in contact with the stops 85 of the coresponding electro-magnets, while the gear shifter is in neutral position, and the clutch pedal is fully depressed, as shown in Figure 8, and from this position of the parts any shift of gears whatsoever may be obtained by simply energizing the electro-magnet corresponding to a particular shift, when, upon releasing foot pressure from the clutch pedals, the retractor spring 80 operates to rotate or oscillate the rocker arms 52 and 53, as hereinbefore explained. It is also to be noted that the slot 61, in the clutch rod 62, allows for a certain amount of free movement of the clutch pedal 66, the purposes of which free movement is to allow for full disengagement of the driving clutch of the vehicle without affecting the gear shifter. It is, therefore, obvious that a vehicle may be brought to a standstill even while the transmission is in gear. Also, that when all of the electro-magnets are de-energized, the transmission will remain neutralized, and the electro-magnets will remain in the position as shown in Figures 5 and 8.

In the operation of the gear shifter to bring the reverse gear into operative position, the operator will depress the push button switch 95, at the steering wheel c, to complete the electrical circuit to conductor 91 to the coil 82 of the electro-magnet 45, and by way of conductor 86 to the battery 87, and from thence to ground and back to the ground connection of the switch 95. With the clutch pedal depressed, the operator now releases the foot pressure on the pedal, and the spring 80 being under tension immediately acts to rotate the rocker arms 52 and 53 in a clockwise direction. The reverse electro-magnet, being energized, has its plunger 71 held fast against its stop 85 by means of the magnetizing force of the energized coil of this magnet. The action of the retractor spring 80 is transmitted through the reverse magnet 45, and rotates the arm 34 in a counter-clockwise direction. As the arm 34 rotates in this direction, the shaft 22 is also rotated in a similar direction with the arm 24 at its opposite end, when the reverse low transmission rod 32 is slid backwardly to the full reverse speed position, and the reverse gear is similarly moved into mesh. In the event of the transmission being in a forward speed position, as when the transmission rod 32 is in its extreme forward position, to mesh the "low" speed gear, the parts of the mechanism will be positioned, as shown in Figure 9 and as hereinbefore explained. Under these conditions, the operator, by depressing the push button 95 for bringing the vehicle into reverse speed position, the electrical circuit just described will be completed. Now, regardless of the fact that the operator depresses the button 95 simultaneously with the depression of the clutch pedal, or after the clutch pedal is fully depressed, the transmission gears become fully neutralized at the time when the clutch pedal completes its stroke and reaches the position as shown in Figure 8. This neutralization is accomplished by means of the "low" magnetic link 44, which is fully operative, and has pushed the arm 34 into the full neutral position at the time that the clutch pedal rotated in a clockwise direction and the rocker arms 52 and 53 rotated counter-clockwise to the position as shown in Figure 8. This is accomplished by the rocker arms 52 and 53 being rotated against the tension of the spring 80, and pushing the "low" magnetic link 44 in a manner that the arm 34 is also rotated counter-clockwise, together with the shaft 22 and the arm 24 at its opposite end, which movement of the parts effect the movement of the reverse low transmission rod 32 to the neutral position. At the time the full neutral position is reached, all four plungers 71 of the electromagnets 42, 43, 44 and 45, have moved into contact with the corresponding stops 85 of the latter, it being understood that in the interim, the operator has released the push button 94 to deenergize the circuit through the low magnetic coupling 44. Thus, with the transmission in any of its forward speed positions, and without resorting to an operation to first bring the transmission to neutral position, the subsequent closing of the reversing shift circuit will cause the operation of the mechanism to bring the transmission to neutral position automatically and simultaneously with the movements of the shifter mechanism to place the transmission in reverse.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. The combination with a variable speed and reverse transmission and a clutch operating member of a motor vehicle or the like, a rocker member operatively connected to the clutch operating member, dual revoluble shafts operatively connected to the gear shifting members of the transmission, rocking means carried by said shafts holding magnets interposed between said rocker member and said rocking means, means for actuating said rocker member upon the release of the clutch operating member from depressed position, and means for selectively energizing said holding magnets for transmitting the motion of said rocker member to said dual revoluble shafts through said rocking means for shifting a gear of the transmission upon the actuation of said rocker member.

2. The combination with a variable speed and reverse transmission and a clutch operating member of a motor vehicle or the like, a rocker member operatively connected to the clutch operating member, dual revoluble shafts operatively connected to the gear shifting members of the transmission, actuating means for said shafts, holding magnets arranged in pairs and operatively connected at one of their ends to said rocker member, and the opposite ends of each pair to the actuating means of the said shafts, means for actuating said rocker member upon the releasing of the clutch operating member from depressed position, and means for selectively energizing one or the other of the holding magnets of each pair of the two whereby the desired shifting of a particular gear of the transmission is accomplished through the holding magnets so energized.

3. The combination with a variable speed and reverse transmission unit including the usual gear shifting members thereof, and a clutch operating member of a motor vehicle or the like, a rockable frame operatively connected to the clutch operating member, a tubular shaft operatively connected to one of the gear shifting members of the transmission unit, a shaft within the said tubular shaft and operatively connected with the other of the gear shifting members of the transmission unit, operating members carried by said shafts for the independent actuation thereof, electro-magnetic means extending between said frame and said operating members, means for actuating said frame upon the release of the clutch operating member from a depressed position, and means for selectively energizing said electro-magnetic means for transmitting the motion of said frame to one or the other of said shafts through said operating members for shifting a gear of the transmission unit upon the actuation of said frame.

4. The combination with a variable speed and reverse transmission unit including the usual gear shifting members thereof and a clutch operating member of a motor vehicle or the like, a rockable frame operatively connected to the clutch operating member, a tubular shaft operatively connected to one of the gear shifting members of the transmission unit, a shaft within said tubular shaft and operatively connected with the other of the gear shifting members of the transmission unit, operating members carried by said shafts for the independent actuation thereof, electro-magnetic means extending between said frame and said operating members, spring means for actuating said frame upon the release of the clutch operating member from a depressed position, and means for selectively energizing said electro-magnetic means for transmitting the motion of said frame to one or the other of said shafts through said operating members for shifting a gear of the transmission unit upon the actuation of said frame, said spring means being placed under compression by the movement of said clutch operating member to depressed position.

WILLIAM G. STEVENS, Jr.